United States Patent

[11] 3,540,593

| [72] | Inventor | Eugene F. Stewart<br>2 Dana Road, Peabody, Massachusetts 01960 |
|---|---|---|
| [21] | Appl. No. | 816,937 |
| [22] | Filed | April 17, 1969 |
| [45] | Patented | Nov. 17, 1970 |

[54] DISPOSABLE AQUARIUM FILTER
11 Claims, 4 Drawing Figs.

[52] U.S. Cl. ................................................. 210/169,
210/266
[51] Int. Cl. ..................................................... E04h 3/20
[50] Field of Search ........................................ 210/169;
119/5

[56] References Cited
UNITED STATES PATENTS
2,665,250  1/1954  Willinger et al. ............. 210/169

*Primary Examiner*—Reuben Friedman
*Assistant Examiner*—T. A. Granger
*Attorney*—Melvin E. Frederick ABSTRACT: A disposable filter device adapted to be supported in an aquarium tank, partially above the normal water level, and connected to an outside air pump for drawing water from the bottom of the tank and lifting it above the normal water level, whereby the water passes downward through the filter device and back into the tank. In the preferred embodiment, the case of the filter is comprised of a flat transparent rear piece and an opaque front piece defining in side view a generally rectangular water-receiving upper portion, a downwardly tapering filtering middle portion, and a water-discharging bottom portion. In the filter portion, there is disposed a layer of filter material over particulate purifying matter and means to hold the filter material against substantial movement, the water-discharging portion being adapted to prevent the purifying material from entering and plugging it.

Patented Nov. 17, 1970

3,540,593

EUGENE F. STEWART
INVENTOR

Melvin E. Frederick
ATTORNEY

Patented Nov. 17, 1970

3,540,593

EUGENE F. STEWART
INVENTOR

Melvin E. Frederick
ATTORNEY

DISPOSABLE AQUARIUM FILTER

This invention relates to filter devices for aquarium tanks, and is particularly directed to disposable devices of this category employing water filtering and purifying means.

The aquariums that are normally used for cultivating fish in the home are relatively small. The water in such aquariums is practically stationary and is seldom replaced. The water of such an aquarium becomes contaminated with excretion from the fish and other foreign matter which fall into or is placed in the aquarium. Accordingly, cleaning of the water is necessary.

In order to provide a practical filtering device, it is necessary for the filter medium to be disposed in a manner which permits facile removal for cleaning purposes and substitution of replacement filter materials. In one type of prior art above-gravel bottom filtering devices, a filtering chamber is contained in a casing that is positioned upon the floor of the tank, the water inlet portion being at the top of that casing. Accordingly, in such devices the pump or other means employed to direct the water into the filtering device must raise the water to the top of the casing. In such devices only the upper portion of the tank water is purified and a considerable portion of the dirt and undesirable foreign matter in the tank remains at the bottom thereof unless a very powerful pump is employed.

Presently available above-gravel bottom filters, such as for example as shown and disclosed in U.S. Pat. Nos. 3,145,168 and 3,333,701 vary in size but are normally 4 inch to 6 inch square and 4 inch to 6 inch high. In small aquarium tanks (2 to 5 gallon capacity for example), this is most significant as such a loss in space can amount to as much as one-fourth or more of the total capacity. Such a loss in space represents an important loss of swimming space and bottom resting and planting areas. Still further, removal of these devices can result in a not inconsequential loss of water.

In the undergravel type of filter (which by design must be installed before gravel, water, plants, fish and the like are introduced into the tank) on occasion this type of filter becomes clogged to the point of becoming useless and in any event, eventually requires cleaning. Needless to say, any maintenance of undergravel filters requires a complete removal of the contents of an aquarium and then, after the cleaning the aforementioned contents of the aquarium must be reinstalled.

Because conventional "permanent"or nondisposable filters by design not only permit but require periodic maintenance for removal of accumulated waste material that has been filtered from the water, visual inspection of the interior of the filter during use is permitted by making the case, if not the entire filter, of transparent plastic. While this simple expedient readily permits one to determine at a glance when cleaning is necessary, all of the collected waste which is most unpleasant in appearance unfortunately is continuously visible at every glance. Accordingly, from a time shortly after cleaning such a filter, because of its unpleasant appearance such a filter substantially detracts from the otherwise pleasing appearance of aquariums.

Although timely and thorough cleaning of any filter will prevent pollutation, unless a filter is sterilized after being cleaned, communicable diseases originating with the waste material will be reintroduced into the aquarium tank. Inasmuch as all prior art filters are intended to be reused indefinitely, the elimination of diseases with such filters is impossible without sterilization, and this is not possible since the plastic used to fabricate such filters will not withstand the temperatures necessary for sterilization. Further, it is firmly believed that very few if any people (including the reader) would take the time or go the lengths necessary to sterilize a filter even if a sterilizable filter were available.

It is one of the objects of this invention to provide a water filtering and purifying device that does not have the shortcomings noted hereinabove.

It is another object of this invention to provide an aesthetically attractive and low-cost device having none of the shortcomings noted above.

It is a further object of this invention to provide a new and improved top filter for aquariums which is disposable, thereby obviating the need for frequent cleaning.

It is a still further object of this invention to provide an aquarium filter which is simple and convenient to manufacture and to use, which will give generally efficient and durable service, and that permits visual inspection of the interior of the filter while still presenting a pleasing appearance irrespective of the contents of the filter.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
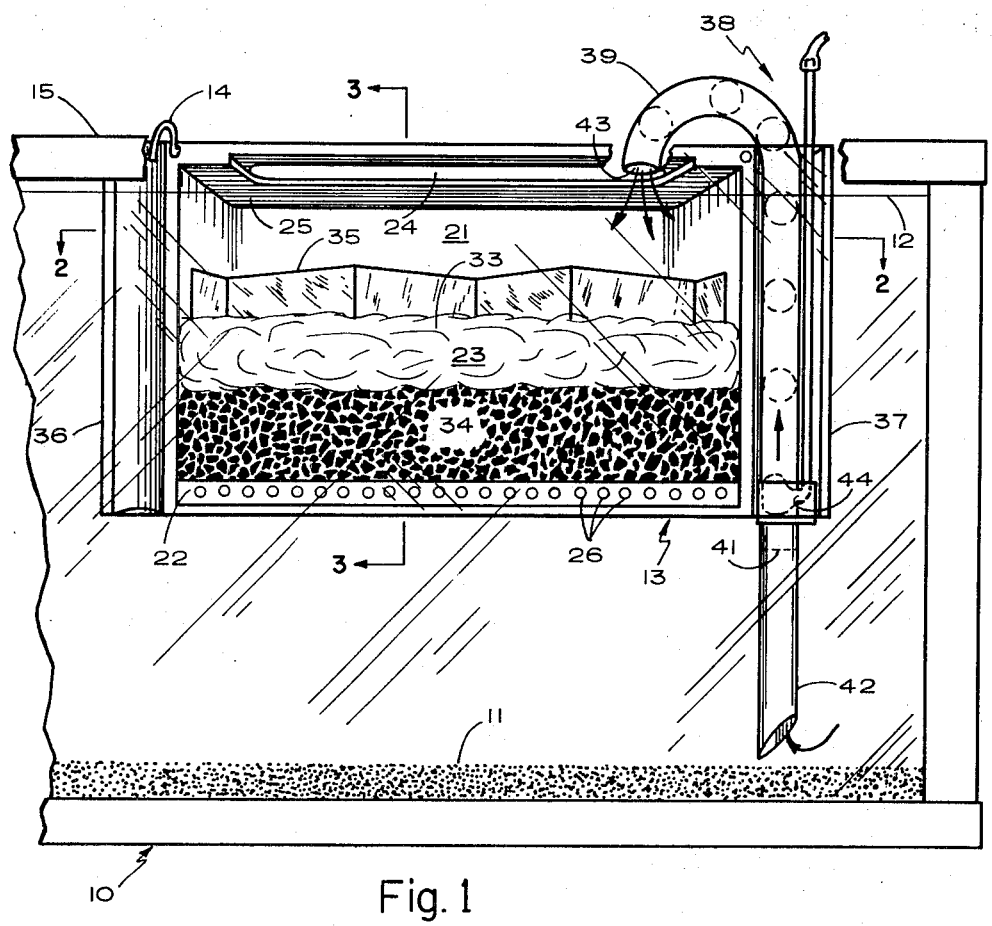
FIG. 1 is a fragmentary side elevational view of an aquarium tank within which is disposed a filter device according to one form of this invention, a rear view of said device being illustrated.

Referring to FIG. 1, the preferred form of a filter embodying the present invention is adapted for use with a conventional aquarium 10 generally having a bed of sand or the like 11 in the bottom thereof. Water having a level 12 adjacent the uppermost edge of the aquarium covers the bed of sand. As shown in FIG. 1, the filter, generally referred to by the numeral 13, is preferably supported as by hooks 14 from the top edge 15 of a wall of the aquarium so that a portion of it extends above the level of the water. For a high water level as shown one uses short hooks or the like as shown whereas for a lower water level, suitably longer hooks are required, their length being such that the upper surface of the filter is disposed above the water level.

Figure 3:
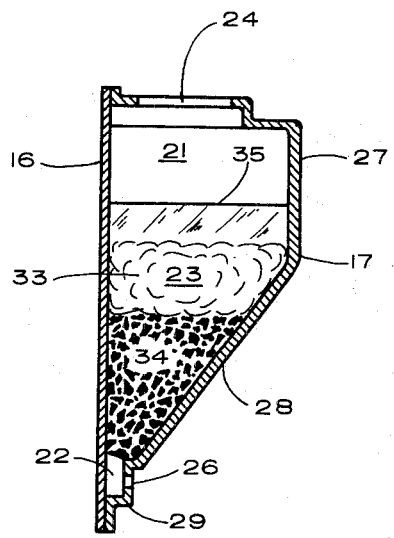
FIG. 3 is a side view taken on line 3–14 3 of FIG. 1.

The main components of the filter 13 includes a plastic casing comprising preferably a substantially flat, imperforate and transparent rear piece 16 bonded to an opaque, imperforate front piece 17 the majority of which extends away from the rear piece 16 to define a water receiving upper portion 21, a water discharging bottom portion 22, and a filtering middle portion 23 intermediate the aforementioned upper and bottom portions. The front piece 17 may be provided with a large access opening 24 in its upper surface 25 for receiving aquarium water, venting air where an air pump is used, permitting the pump feed tube to be mounted on either side of the casing and to simplify and facilitate removal of fish and the like that might be sucked up and trapped in the filter. A plurality of water discharge ports 26 are provided extending along and adjacent the lowermost edge of the front piece 17. While front piece 17 may take substantially any configuration and/or color, such as for example to simulate a rock, log, or the like, in order to provide the maximum interior space, it preferably has a generally flat upper surface 25 normal to the rear piece 16, a generally flat upper front surface 27 parallel to the rear piece, a middle front surface 28 that extends downwardly and back toward the rear piece at an angle, and a lower front surface 29 that is parallel to the rear piece and spaced a distance therefrom just sufficient to prevent the purifying material, such as charcoal or the like, from entering the water-discharging bottom portion 22 defined by the rear piece 16 and the lower front surface 29. The sides 31 and 32 of the front piece may be disposed at an acute angle to the rear piece 16. The aforementioned configuration of the front piece defines the aforementioned water-receiving upper portion 21 having in cross section, as best shown in FIG. 3, a generally rectangular shape, the water-discharging bottom portion 22 having in cross section a generally rectangular shape and a filtering middle portion 23 having in cross section a generally triangular shape. While the filtering middle portion 23 may have a shape other than triangular, the triangular shape as shown in FIG. 3 is preferred because it provides maximum cross-sectional area for the filter material 33 with a minimum (but sufficient) volume for the water-purifying material 34, such as charcoal. Further, the triangular shape not only is more effective in retaining the charcoal against shifting during shipping and the like than would be the case if a more rectangular shape were provided, but permits the provision of a water-discharging portion directly below and in communication with the charcoal that remains at least substantially free and unobstructed, the charcoal being unable to enter it but water being able to freely enter and leave it.

Disposed within and filling the filtering portion is particulate water purifying material 34 such as charcoal covered by a layer of filtering material 33 such as glass wool. A thin and narrow brace 35, composed of a strip of plastic conveniently permanently bent and disposed on edge and contacting the casing at a plurality of points is bonded to the interior of the casing such that its lower edge is in contact with the glass wool 33. The brace 35, while not essential or even necessary during use of the filter, is essential to and functions to retain the charcoal 34 and glass wool 33 in position during shipment and handling. Thus, in accordance with the invention, the filter may be handled, or mishandled as the case may be, without affecting the efficiency, filtering capability, or pleasing appearance of the filter while still providing a space 21 for receiving water above the filtering material. Further, if desired, the charcoal 34 may be initially contained in a bag of a commercially available nontoxic water-soluble paper to prevent the charcoal from shifting or mixing with the glass wool during shipment and presenting an unpleasing and dirty appearance at the time of use due to sifting of the black powder that invariably occurs with charcoal and the like. During shipment and handling prior to use, the water-soluble paper prevents mixing of the charcoal with the glass wool, entry of charcoal into the water-discharging portion bottom portion 22, and particularly sifting of charcoal powder throughout the casing. However, when the filter is first submerged in water at the time of use, or shortly after it is put in use, the paper, being water soluble, is completely dissolved and carried away without any adverse effects.

While a thin and narrow brace 35 bonded to the casing has been shown and described for preventing substantial movement of the filtering material and water-purifying material, it is to be understood that other means, having a different configuration or arrangement, may be used to provide substantially the same results as does brace 35. Further, rather than bonding the brace to the case, the front and/or rear piece may be provided with recesses, projections or the like (not shown) to engage the brace and/or recesses or projections on the brace to hold it in place.

Figure 2:
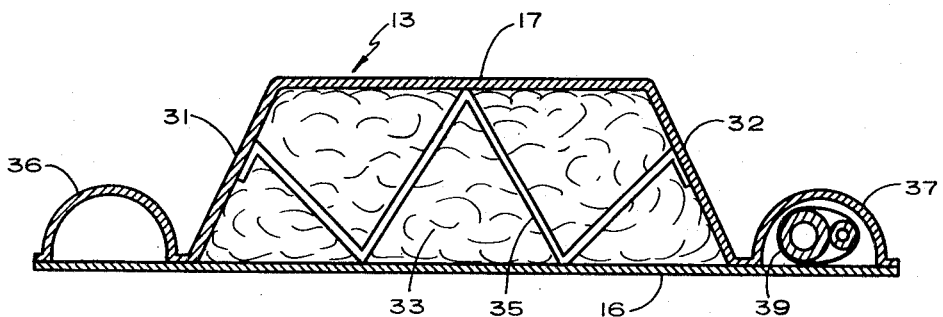
FIG. 2 is a top view taken on line 2–2 of FIG. 1.

Directing attention now to FIGS. 1 and 2, it will be seen that there is provided at each side of the casing and exterior thereof, tubular means 36 and 37 for supporting an air pump feed tube. Such tubular support means may conveniently be formed by flat extensions of the rear piece and curved extensions of the front piece. The tubular support means 36 and 37 are dimensioned to freely receive the feed tube of a conventional air pump. The feed tube designated generally by the numeral 38 may comprise a main tube 39 having a water inlet port 41 for receiving aquarium water (preferably) through an extension 42 which terminates adjacent the bottom of the aquarium, a water outlet port 43 disposed over the opening 24 for discharging water into the casing, and an air inlet port 44 intermediate the water inlet and outlet ports for receiving air under pressure and introducing it as bubbles into the main tube 39 for effecting, in conventional manner, the pumping of water into the filter.

Where the filter requires a separate feed tube for the air pump, other means may be provided to support the feed tube in cooperative engagement. Thus, if desired, the rear piece may be provided with ears or wings (not shown) which are bent around and bonded to the front piece. On the other hand, the feed tube may be provided with suitable hooks, prongs or the like, which engage the casing and support it in an operative position.

Figure 4:
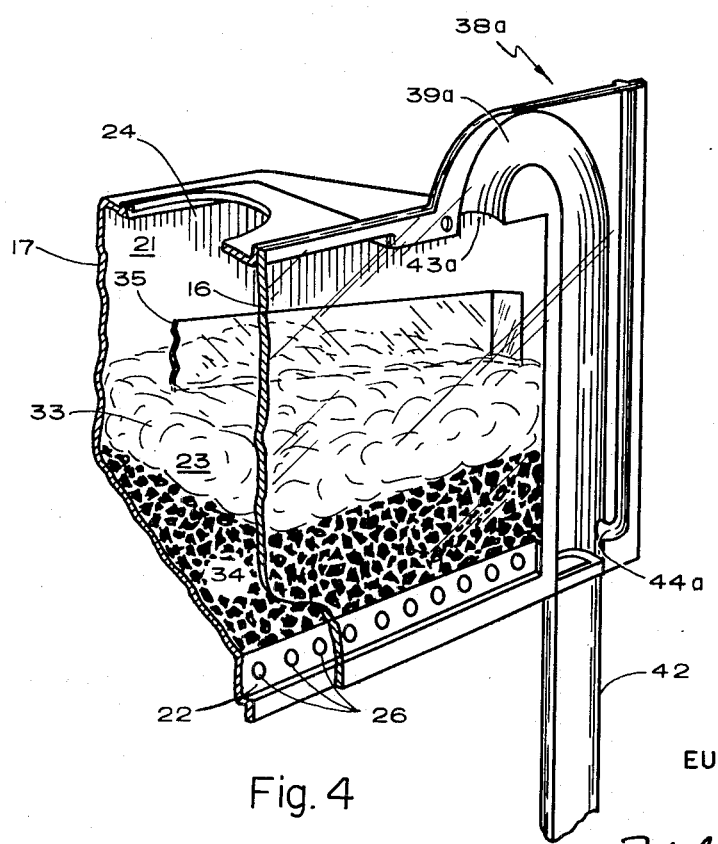
FIG. 4 is a fragmentary perspective view of a modification wherein the air pump is integral with and formed by the case.

FIG. 4 shows a still further embodiment where the front and rear pieces 16 and 17 define the feed tube 38a comprising a main tube 39a, water inlet port 41a, water outlet port 43a, and an air inlet port 44a, as and for the purposes hereinbefore described.

Provision of the feed tube integral with the casing substantially as shown in FIG. 4 eliminates the necessity of separately providing feed tubes with original or replacement filters and the necessity and expense of providing means to support such a separate feed tube in cooperative engagement with the filter.

In its preferred embodiment, the rear piece is formed essentially flat so that in use the filter may be disposed closely against the rear wall of the aquarium, the filter being supported or hung from hooks or the like which engage the uppermost edge of the aquarium and maintain at least a portion of the water-receiving portion of the filter above the aquarium water level. The front piece of the filter is that portion of the filter which is normally visible to an observer of the aquarium. As may now be apparent, since only the front piece is normally seen by an observer, it preferably is opaque to keep from view the interior of the filter, which during use normally does not present a pleasing sight. Accordingly, to permit visual inspection of substantially the entire interior of the filter, the rear piece is preferably made transparent.

In use of the present invention, air enters the main tube 39 in conventional manner via air inlet port 44. Since the air inlet port 44 is below the aquarium water level and hence the water level in the filter (see FIG. 1) as the air flows upwardly through main tube 39, it displaces water upwardly through water outlet port 43 or 43a and into the casing via opening 24. Additional water is caused to flow up through inlet port 41 via extension 42 which preferably terminates just above the sand or bottom of the aquarium.

Air which goes up the main tube 39 escapes through opening 24 to the atmosphere. The water from main tube 39 enters the water-receiving upper portion of the casing thereby forcing water out of the casing via openings 26 in the water-discharging portion. In this manner water pumped from the bottom of the aquarium enters the casing as described hereinabove and passes down through the glass wool 23 and charcoal 34, which removes waste gases and solids from the water. After passing through the filtering section, the filtered water is forced out the water-discharging bottom portion.

Heretofore, when the charcoal and/or glass wool became contaminated, it was necessary to not only remove the filter from the aquarium but disassemble it, remove the contaminated charcoal and glass wool, clean the filter parts, add new charcoal and glass wool, reassemble the filter, replace it in the aquarium, usually at the bottom thereof, and reconnect it to the air pump.

By way of comparison, a filter in accordance with the present invention, being entirely disposable, completely eliminates all of the distasteful procedures required with prior art filters. Further, by provision of the large opening 24 and tubular support means, not only may trapped fish and the like be easily removed, but the filter may be conveniently located at any point since the air pump feed tube may be simply and quickly operatively located at either side of the casing, thereby permitting selection of a right or left hand feed simply by locating the air pump feed tube on the desired side of the casing.

It may also be pointed out that the entire operation of replacing the filter in accordance with the present invention may be simply, quickly and dependably accomplished by a small child without even getting his fingers wet in the process. Thus, if it can be said to be a relatively simple matter to service prior art filter, then by comparison it can only be child's play to service a filter in accordance with the present invention.

While the initial sale of a filter as shown in FIG. 1 to a new user, for example, would most conveniently include an air pump feed tube and extension as shown and described, this is not essential as any feed tube may be used with the filter which will in conventional manner lift water out of the aquarium and deposit it in the casing. Further, even if an air pump feed tube is provided with some filters of the type shown in FIG. 1, filters sold as replacements clearly will not require a feed tube since the purchaser will already possess one and feed tubes are not particularly prone to contamination and hence will usually only rarely require replacement. On the other hand, provision of a filter as shown in FIG. 4 renders the entire question of feed tubes moot as the feed tube in every case is integral with the casing.

The present invention may be embodied in other specific forms without departing from the spirit and/or essential attributes thereof and, accordingly, reference should be made to the appended claims, rather than to the foregoing specification as indicating the scope of the invention.

I claim:
1. In an aquarium filter, the combination comprising:
   a. a casing, said casing comprising an imperforate, transparent and substantially flat rear piece and an imperforate front piece, said front piece being opaque and extending outwardly from said rear piece to define within said casing a water-receiving upper portion, a water-discharging bottom portion, and a filtering middle portion intermediate said upper and bottom portions, said upper portion having a flat top piece extending inwardly from said rear piece and said front piece to define an opening having a cross-sectional area less than that of said upper portion and said bottom portion having at least one water discharge port;
   b. particulate water-purifying material disposed in a water-soluble bag in said filtering portion above said discharge port;
   c. fibrous filtering material disposed in said filtering portion and covering said water-purifying material;
   d. means disposed in said casing between said filter material and said top piece for preventing substantial movement of said filter material; and
   e. support means adapted for engagement with said aquarium and said casing whereby during use a part of said upper portion is disposed above the normal water line of an aquarium.
2. The combination as defined in claim 1 wherein said opening is disposed in and comprises a substantial portion of said flat top piece.
3. The combination as defined in claim 1 wherein said casing has sides and defines tubular support means adjacent and parallel to at least one of said sides.
4. The combination as defined in claim 3 and additionally including elongated air pump feed tube means for receiving water from said aquarium and pumping it into said casing, said air pump feed tube means being adapted to be disposed in and carried by said tubular support means and including a tube having a curved end portion the extreme end of which defines a water outlet port which terminates over said opening when said air pump feed tube is disposed in said passage.
5. The combination as defined in claim 1 wherein said front and rear pieces additionally define air pump feed tube means for receiving water from said aquarium and exhausting it into said water-receiving upper portion.
6. The combination as defined in claim 1 wherein in cross section said water receiving upper portion is generally rectangular in shape, said filtering middle portion is generally triangular in shape, and said water-discharging bottom portion is generally rectangular in shape and dimensioned such that said water-purifying material substantially cannot enter it.
7. In an aquarium filter, the combination comprising:
   a. a casing, said casing comprising an imperforate, substantially flat, and transparent rear piece sealably attached to an imperforate and opaque front piece, said front piece extending outwardly away from said rear piece to define within said casing a water-receiving upper portion, a water-discharging bottom portion, and a filtering middle portion intermediate said upper and bottom portions, said upper portion including an upper surface extending inwardly from said rear piece and said front piece to define an opening having a cross-sectional area less that that of said upper portion and said bottom portion having at least one water discharge port;
   b. particulate water-purifying material disposed in said middle portion above said discharge ports;
   c. fibrous filtering material disposed in said filtering portion and covering said water-purifying material;
   d. means carried in said casing in contact with said filter material for preventing substantial movement of said filter and water-purifying material, said means comprising a thin strip of material substantially only one edge of which is in contact with said filter material, said water-receiving upper portion in cross section being generally rectangular in shape and said filtering middle portion in cross section being generally triangular in shape; and
   e. support means adapted for engagement with said aquarium and said casing and supporting said upper surface at about the upper edge of said aquarium and above the normal water line of said aquarium.
8. The combination as defined in claim 7 and additionally including air pump feed tube means for pumping water into said casing, said means including a pipe having a water inlet port for receiving aquarium water, a water outlet port for discharging water into said water-receiving upper portion, and an air inlet port intermediate said inlet and outlet ports for effecting the pumping of water from said inlet port to said outlet port.
9. The combination as defined in claim 8 wherein said front and rear pieces substantially define said air pump feed tube means.
10. The combination as defined in claim 8 wherein said rear piece at least in part defines means for supporting said air pump feed tube means exteriorly of said casing.
11. The combination as defined in claim 8 wherein said front piece at least in part defines means for supporting said air pump feed tube means exteriorly of said casing.